United States Patent
Chen et al.

(10) Patent No.: US 8,274,250 B2
(45) Date of Patent: Sep. 25, 2012

(54) METHOD FOR CONTROLLING A DIRECT CURRENT BRUSHLESS MOTOR, AND CONTROL CIRCUIT

(75) Inventors: Hsuan-Chuan Chen, Hsinchu (TW); Wen-Jung Su, Chupei (TW)

(73) Assignee: Feeling Technology Corp., Chupei, Hsinchu County (TW)

( * ) Notice: Subject to any disclaimer, the term of this patent is extended or adjusted under 35 U.S.C. 154(b) by 1050 days.

(21) Appl. No.: 12/207,663

(22) Filed: Sep. 10, 2008

(65) Prior Publication Data
US 2009/0167226 A1 Jul. 2, 2009

(30) Foreign Application Priority Data
Dec. 28, 2007 (TW) ................ 96150770 A

(51) Int. Cl.
*H02P 6/18* (2006.01)
(52) U.S. Cl. .................... 318/400.34; 318/811
(58) Field of Classification Search ............. 318/400.05, 318/400.06, 400.32, 400.33, 400.34, 400.35, 318/599, 811
See application file for complete search history.

(56) References Cited

U.S. PATENT DOCUMENTS

| | | | | |
|---|---|---|---|---|
| 5,731,670 A * | 3/1998 | Galbiati et al. | .......... | 318/400.35 |
| 5,859,512 A * | 1/1999 | Buthker | .................. | 318/400.04 |
| 5,949,203 A * | 9/1999 | Buthker | .................. | 318/400.34 |
| 6,163,120 A * | 12/2000 | Menegoli | ................. | 318/400.35 |
| 6,420,847 B1 * | 7/2002 | Galbiati et al. | ............... | 318/727 |
| 7,609,013 B2 * | 10/2009 | Sugie | ....................... | 318/400.06 |
| 7,855,521 B2 * | 12/2010 | Otaguro | .......................... | 318/4 |
| 7,855,523 B2 * | 12/2010 | Kuwamura | ............. | 318/400.25 |
| 2008/0252238 A1 * | 10/2008 | Otaguro | .................... | 318/400.05 |
| 2008/0252240 A1 * | 10/2008 | Sugie | ..................... | 318/400.06 |
| 2009/0033263 A1 * | 2/2009 | Cassiano et al. | ........ | 318/400.35 |
| 2010/0201295 A1 * | 8/2010 | Kuwamura | .............. | 318/400.04 |

* cited by examiner

*Primary Examiner* — Eduardo Colon Santana
(74) *Attorney, Agent, or Firm* — Thomas, Kayden, Horstemeyer & Risley, LLP

(57) ABSTRACT

A method for controlling a direct current (DC) brushless motor, and a control circuit thereof are provided. The DC brushless motor is sensorless. In response to a digital output signal that is applied to drive the direct current brushless motor, detection of a back electromotive force (BEMF) is ceased in a predetermined time interval, so as to avoid detecting erroneous BEMF and keep normal operation of the direct current brushless motor.

19 Claims, 3 Drawing Sheets

METHOD FOR CONTROLLING A DIRECT CURRENT BRUSHLESS MOTOR, AND CONTROL CIRCUIT

This application claims priority to Taiwan Patent Application No. 096150770 filed on Dec. 28, 2007, the disclosures of which are incorporated herein by reference in their entirety.

CROSS-REFERENCES TO RELATED APPLICATIONS

Not applicable.

BACKGROUND OF THE INVENTION

1. Field of the Invention

The present invention relates to a control method for a direct current (DC) brushless motor, and particularly, relates to a pulse width modulation (PWM) control method for a sensorless DC brushless motor.

2. Descriptions of the Related Art

Currently, DC brushless motors typically employ a pulse width modulated (PWM) power input to change speeds. However, such a PWM input signal has an impact on the back electromotive force (BEMF) detecting circuit, causing an incorrect BEMF signal to be generated by the BEMF detecting circuit. Consequently, when a zero crossing (ZC) occurs to the incorrect BEMF signal, a mistaken phase switching may take place and cause a failure in the normal operations. Accordingly, it has been important to prevent mistaken phase switching.

U.S. Pat. No. 5,767,654 discloses a method for detecting a BEMF. According to this method, the time at which the BEMF crosses zero is predicted, and a PWM input signal is maintained high prior to the zero-crossing. Normal PWM operations occur only when the BEMF detecting circuit detects the zero crossing of the BEMF.

U.S. Pat. No. 5,789,895 discloses another method for detecting a BEMF. According to this method, a reference value is preset. Once the BEMF crosses this reference value, a PWM input signal will be maintained high. Normal PWM operations resume when the BEMF detecting circuit detects the zero crossing of the BEMF.

However, both methods provide detection of a correct BEMF signal, but at a cost of suspending normal PWM operations. Consequently, the DC brushless motor still cannot operate according to the normal PWM signal at all times, causing failure of the motor to operate at a steady speed.

In view of this, it is highly desirable in the art to provide a control method and a circuit for preventing incorrect detections of a BEMF while maintaining a normal operation of the motor.

SUMMARY OF THE INVENTION

One objective of this invention is to provide a control method for preventing the incorrect detection of a BEMF while maintaining the normal operation of a motor. According to this method, the detection of the BEMF ceases in response to a digital output signal for driving a DC brushless motor in a predetermined time interval to prevent the incorrect detection of the BEMF.

Another objective of this invention is to provide a control circuit for implementing this control method. A DC brushless motor incorporating such a control circuit will be free from the incorrect detection of the BEMF and maintain continuous normal operations.

To this end, a control circuit disclosed in this invention comprises an output circuit, a pulse generating circuit, a detecting circuit and a mask circuit. The output circuit, which is coupled to a coil of the DC brushless motor, receives a PWM signal and generates a digital output signal synchronous with the PWM signal for driving the DC brushless motor. The pulse generating circuit, which is coupled to the output circuit, is adapted to generate and provide a serial square wave signal to the output circuit for generating the digital output signal. The detecting circuit, which is coupled to the pulse generating circuit, is adapted to detect a BEMF generated in accordance with the operation of the DC brushless motor and to generate a detection signal in response to the BEMF, so that the pulse generating circuit generates the serial square wave signal in response to the detection signal. The mask circuit, which is coupled to the pulse generating circuit, is adapted to generate a mask signal in response to the PWM signal, so that the pulse generating circuit generates the serial square wave signal in response to the mask signal in a predetermined time interval.

This invention further discloses a method for controlling a DC brushless motor, which comprises the following steps: receiving a PWM signal and generating a digital output signal synchronous with the PWM signal to drive the DC brushless motor; detecting a BEMF generated in accordance with the operation of the DC brushless motor; continuously driving the DC brushless motor in response to the BEMF; and ceasing the detection of the BEMF in a predetermined time interval in response to the digital output signal.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Embodiments will be described herein to explain this invention, which provides a circuit and a method for controlling the DC brushless motor. With this invention, the incorrect detection of a BEMF is prevented while still maintaining the normal operation of the DC brushless motor. However, these embodiments are not intended to limit this invention only in any specific context, applications or with particular methods described in these embodiments. Therefore, the description of these embodiments is only intended to illustrate rather than to limit this invention. It should be noted that in the following embodiments and attached drawings, elements not directly related to this invention are omitted from depiction, and dimensional relationships among individual elements are exaggerated for ease of understanding.

Figure 1:
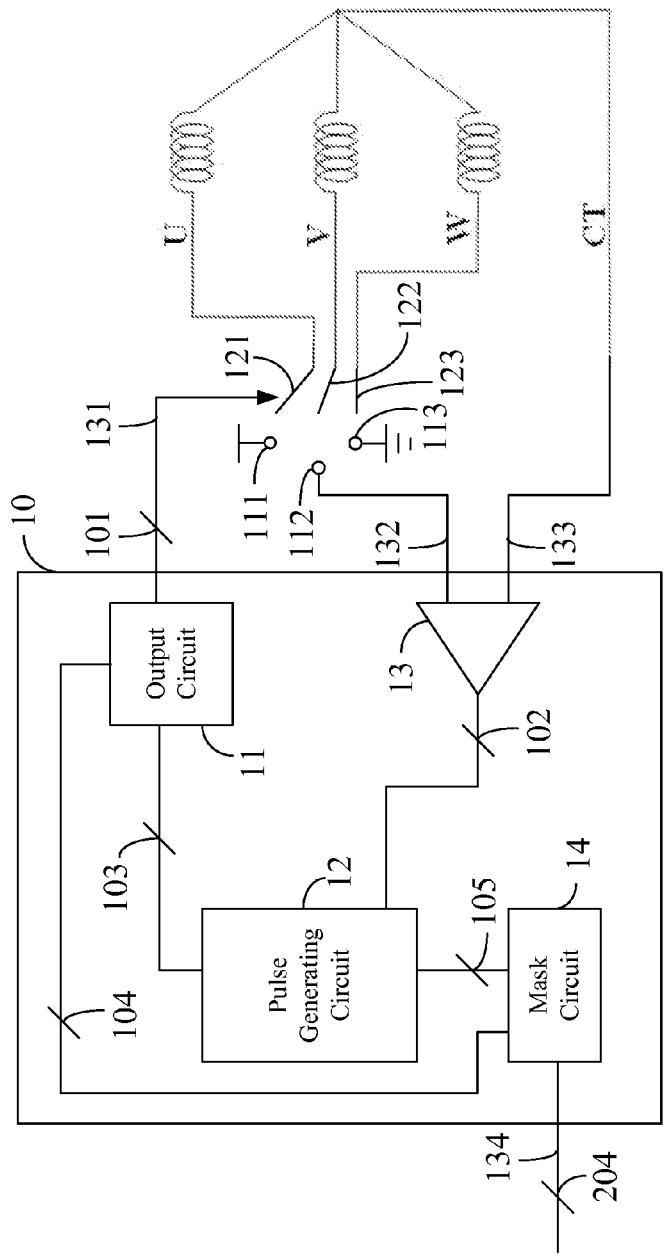
FIG. 1 illustrates the control circuit of this invention.

FIG. 1 depicts the preferred embodiment of this invention, which illustrates the control circuit 10 and connections between the control circuit 10 and coils of a DC brushless motor. In this embodiment, the DC brushless motor is a three-phase motor comprising coils U, V and W with a central tap CT. It should be noted that this invention is not just limited to this number of coils. The control circuit 10 comprises an output circuit 11, a pulse generating circuit 12, a detecting circuit 13 and a mask circuit 14. The output circuit 11 is adapted to control a plurality of coils U, V and W of the DC brushless motor, and to generate a digital output signal 101 to drive the DC brushless motor via a bus 131.

Furthermore, the output circuit 11 receives a PWM signal 104 synchronous with the digital output signal 101. The coils U, V and W are connected to a power supply terminal 111, an input terminal 112 of the detecting circuit 13 and a ground terminal 113 via switches 121, 122 and 123 respectively. For example, if the coil U is connected to the power supply terminal 111 and the coil W is connected to the ground terminal 113, the coil V is connected to the input terminal 112, in which case a BENF generated across the coil V becomes the input signal of the detecting circuit 13. The digital output signal 101 is adapted to control the connections of the coils U, V and W with the power supply terminal 111, the input terminal 112 of the detecting circuit 13 and the ground terminal 113 in sequence via the bus 131. The operation of the control circuit 10 will be further explained below with the coil connections described above as an example.

The digital output signal 101 controls the connections of the switches 121, 122 and 123 connected to the coils U, V and W respectively with the power supply terminal 111 and the ground terminal 113. In one embodiment, each of the switches may be a switch circuit comprised of a P-type metal-oxide-semiconductor field-effect transistor (PMOS FET) and an N-type metal-oxide-semiconductor field-effect transistor (NMOS FET). The PMOS FET and the NMOS FET both have a gate, which is adapted to receive the digital output signal 101 for controlling the conduction status of the PMOS FET and the NMOS FET. In this way, the coils are controlled by the PMOS FET and the NMOS FET to be connected to the power supply terminal 111, the ground terminal 113 or be floating. In this embodiment, the digital output signal 101 comprises a number of signals to control the switches 121, 122 and 123 respectively.

Furthermore, in this embodiment, the digital output signal 101 is inputted to the gates of the switches 121, 122 and 123 via the bus 131 respectively to control the connections of the coils U, V and W with the power supply terminal 111 and the ground terminal 113.

The PWM signal 104 also controls the input of a driving power into the power supply terminal 111. The power is transmitted through two of the coils U, V and W and returns through the ground terminal 113 to drive the DC brushless motor. For example, the coil V is connected to the power supply terminal 111 via the switch 121, while the coil W is connected to the ground terminal 113 via the switch 123. Then, if the digital output signal 101 is high, the switches 121 and 123 are turned on; otherwise, if the digital output signal 101 is low, the switches 121 and 123 are turned off respectively or simultaneously, leaving the coils V and W floating respectively or simultaneously. By switching the digital output signal 101 high and low as described above, power supplied to the DC brushless motor can be controlled, thereby controlling rotational speed of the DC brushless motor.

The detecting circuit 13 is coupled to a first terminal 132, a second terminal 133 and the pulse generating circuit 12. The first terminal 132 is coupled to one of the switches 121, 122 and 123, and the second terminal 133 is coupled to the central tap CT. Through the first terminal 132 and the second terminal 133, the detecting circuit 13 detects a BEMF generated in accordance with the operation of the DC brushless motor, i.e., a BEMF generated across the coil U. In response to the BEMF, the detecting circuit 13 generates a detecting signal 102, so that a serial square wave signal is generated by the pulse generating circuit 12 in response to the detecting signal 102. The detecting signal is used to represent the occurrence of the zero crossing as mentioned in prior art. In this embodiment, the detecting circuit 13 may be an amplifier configured to generate the detecting signal 102 in response to the BEMF.

The mask circuit 14 is also coupled to a third terminal 134 and the pulse generating circuit 12, and generates a mask signal 105 in response to the PWM signal 104. In response to the mask signal 105, the pulse generating circuit 12 generates a serial square wave signal 103 in a predetermined time interval. The pulse generating circuit 12, which is coupled to the output circuit 11, is adapted to generate and provide the serial square wave signal 103 to the output circuit 11, which then generates the digital output signal 101 to control the switches 121, 122 and 123.

When the switches 121, 122 and 123 are switched, undesirable glitches will be generated, which may cause the detecting circuit 13 to incorrectly detect the BEMF generated in accordance with the operation of the DC brushless motor. Therefore, the mask circuit 14 is provided to generate a mask signal 105 in response to the status changes of the digital output signal 101. Furthermore, because the digital output signal 101 is synchronous with the PWM signal 104, the mask signal 105 can inhibit the pulse generating circuit 12 from receiving the detecting signal 102 from the detecting circuit 13 in a predetermined time interval when the PWM signal 104 changes the status thereof. In other words, whenever a rising edge or a falling edge occurs in the PWM signal 104, the mask circuit 14 generates a mask signal 105 to inhibit the pulse generating circuit 12 from receiving the detection signal 102 from the detecting circuit 13 in a predetermined time interval.

In this embodiment, the mask signal 105 may be a pulse signal with an adjustable pulse width, while the digital output signal 101 has a duty cycle. The adjustable pulse width of the mask signal 105 is less than the duty cycle of the digital output signal 101, so that the digital output signal 101 can still switch the switches 121, 122 and 123. Additionally, the digital output signal 101 and the mask signal 105 both have an adjustable frequency.

Figure 2:
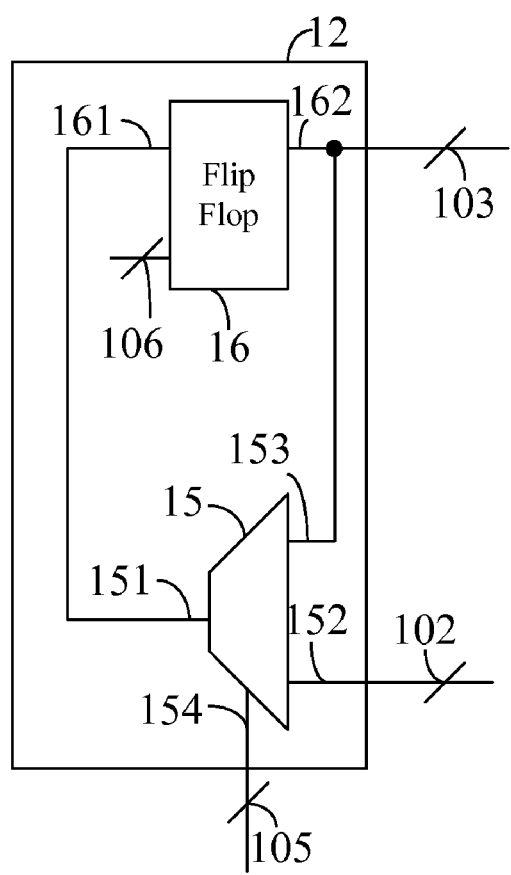
FIG. 2 illustrates a pulse generating circuit.

FIG. 2 illustrates an embodiment of the pulse generating circuit 12. The pulse generating circuit 12 comprises a multiplexer 15 and a flip-flop 16. The multiplexer 15 has an output terminal 151, a first input terminal 152 coupled to the detecting circuit 13, a second input terminal 153 coupled to the output circuit 11, and a select terminal 154 coupled to the mask circuit 14. The flip-flop 16 has an input terminal 161 coupled to the output terminal 151 of the multiplexer 15 and an output terminal 162 coupled to the second input terminal 153 of the multiplexer 15. The flip-flop 16 is configured to receive a clock signal 106 and generate a serial square wave 103. The clock signal 106 has a frequency at least not less than that of the PWM signal 104. The mask signal 105 connects the output terminal 151 of the multiplexer 15 to the second input terminal 153 of the multiplexer 15 in a predetermined time interval, so that the output of the flip-flop 16 is used also as the input thereof. As a result, the normal operation of the flip-flop 16 is maintained to ensure that the digital output signal 101 can still switch the switches 121, 122 and 123.

As depicted in FIG. 1, in this embodiment, in order to generate the mask signal 105 in response to the PWM signal 104, the mask circuit 14 receives an external PWM signal 204 via the third terminal 134, and generates the PWM signal 104 and the mask signal 105 synchronous with each other using internal circuits thereof.

Figure 3:
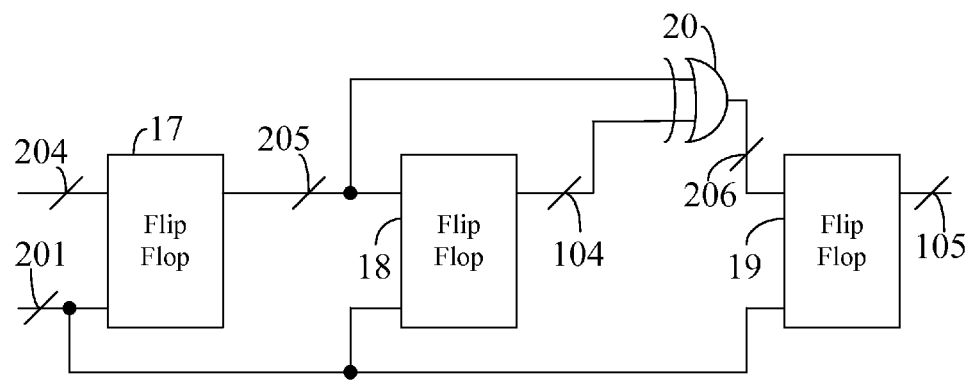
FIG. 3 illustrates a mask circuit.
Figure 4:
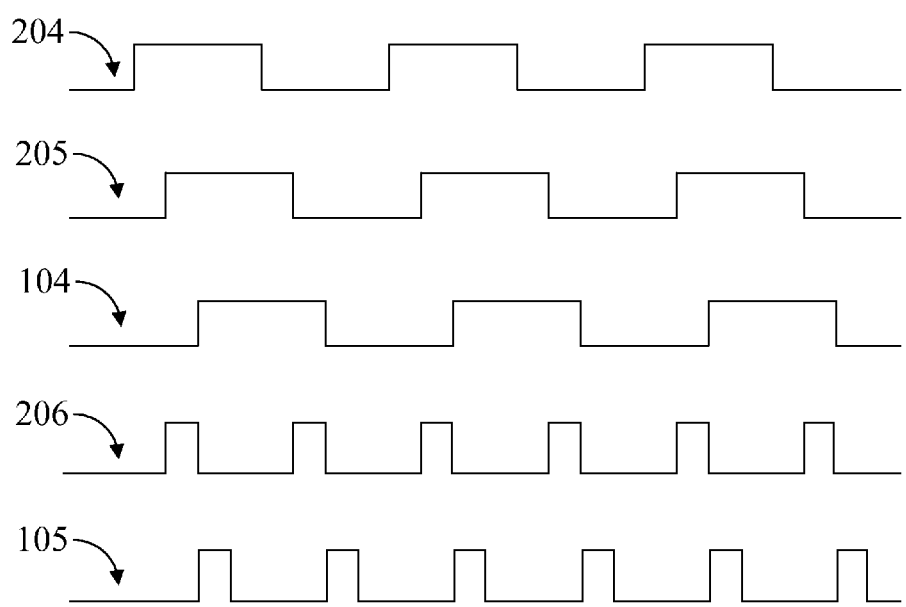
FIG. 4 illustrates the waveforms of individual signals in the mask circuit shown in FIG. 3.

FIG. 3 illustrates an embodiment of the mask circuit 14. The mask circuit 14 comprises three flip-flops 17, 18 and 19 triggered at rising edges and an XOR gate 20. Referring to FIG. 4, the waveforms of the individual signals in the mask circuit 14 of FIG. 3 are depicted therein. The flip-flops 17, 18 and 19 all receive a same clock signal 201. The flip-flop 17 has an input terminal configured to receive the external PWM signal 204, and an output signal 205 thereof is transmitted to the input terminal of the flip-flop 18 and an input terminal of the XOR gate 20. The other input terminal of the XOR gate 20 is configured to receive an output signal of the flip-flop 18, i.e., the aforesaid PWM signal 104.

When either the output signal 205 or the PWM signal 104 is at a logic high "1" and the other is at a logic low "0", the logic operation of the XOR gate 20 presents an output signal 206 of the XOR gate 29 at a logic high "1", as depicted in FIG. 4. The output signal 206 is then transmitted to an input terminal of the flip-flop 19 triggered at a falling edge, thus obtaining an output signal, i.e., the aforesaid mask signal 105. In summary, the main concept of this invention is to generate the PWM signal 104 and the mask signal 105 together. The circuits and descriptions provided above are only for purpose of illustration, rather than to limit scope of this invention. Those skilled in the art may obtain the PWM signal 104 and the mask signal 105 as described in the above embodiments by using other circuits without departing from the spirit of this invention.

It can be seen from FIG. 4 that the mask signal 105 is adapted to be generated when the PWM signal 104 changes the status thereof. The pulse width of the mask signal 15 may be modulate the predetermined time interval described above, and may be modulated by setting the characteristics of the flip-flop 19.

It follows from the above embodiments that, with this invention, impact imposed by glitches, generated when the digital output signal 101 switches the switches 121, 122 and 123, on the detection signal 102 detected by the detecting circuit 13 is completely eliminated. Accordingly, the occurrence of zero crossing of the BEMF can be ascertained correctly, thus maintaining the normal operation of the switches.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A method for controlling a direct current (DC) brushless motor, comprising the steps of:
    (a) receiving a pulse width modulation (PWM) signal and generating a digital output signal synchronous with the PWM signal to drive the DC blushless motor;
    (b) detecting a back electromotive force (BEMF) generated in accordance with operation of the DC brushless motor;
    (c) continuously driving the DC blushless motor in response to the BEMF;
    (d) generating a mask signal when the digital output signal changes a status thereof; and
    (e) ceasing detecting the BEMF in the predetermined time interval in response to the mask signal.

2. The method as claimed in claim 1, wherein the mask signal is a pulse signal with an adjustable pulse width, the digital output signal is provided with a duty cycle, and the adjustable pulse width is less than the duty cycle.

3. The method as claimed in claim 1, wherein the step (d) comprises the step of:
    generating the mask signal at the occurrence of a rising edge or a falling edge of the digital output signal.

4. The method as claimed in claim 1, wherein the digital output signal is provided with an adjustable duty cycle, and the predetermined time interval is less than the adjustable duty cycle.

5. The method as claimed in claim 1, wherein the digital output signal and the mask signal each has an equal adjustable frequency.

6. The method as claimed in claim 1, wherein a frequency of the mask signal is equal to or twice as a frequency of the digital output signal.

7. A control circuit for controlling a direct current (DC) brushless motor, the control circuit comprising:
    an output circuit, coupled to a coil of the DC brushless motor, in which the output circuit receives a pulse width modulation (PWM) signal and generates a digital output signal synchronous with the PWM signal for driving the DC brushless motor;
    a pulse generating circuit, coupled to the output circuit, in which the pulse generating circuit is adapted to generate and provide a serial square wave signal to the output circuit for generating the digital output signal;
    a detecting circuit, coupled to the pulse generating circuit, in which the detecting circuit is adapted to detect a back electromotive force (BEMF) generated in accordance with operation of the DC brushless motor and to generate a detection signal so that the pulse generating circuit generates the serial square wave signal in response to the detection signal; and
    a mask circuit, coupled to the pulse generating circuit, in which the mask circuit is adapted to generate a mask signal in response to an external PWM signal so that the pulse generating circuit generates the serial square wave signal in response to the mask signal in a predetermined time interval, wherein the external PWM signal is synchronous with the PWM signal.

8. The control circuit as claimed in claim 7, wherein the detecting circuit comprises an amplifier configured to generate the detection signal in response to the BEMF.

9. The control circuit as claimed in claim 7, wherein the pulse generating circuit comprises:
    a multiplexer, having an output terminal, a first input terminal coupled to the detecting circuit, a second input terminal coupled to the output circuit, and a select terminal coupled to the mask circuit; and
    a flip-flop, having an input terminal coupled to the output terminal of the multiplexer and an output terminal coupled to the second input terminal of the multiplexer, and being adapted to generate the serial square wave signal;
    wherein the multiplexer connects the output terminal of the multiplexer to the second input terminal of the multiplexer in the predetermined time interval in response to the mask signal.

10. The control circuit as claimed in claim 7, wherein the mask circuit generates the mask signal when the digital output signal changes a status thereof.

11. The control circuit as claimed in claim 7, wherein the mask circuit generates the mask signal by the occurrence of a rising edge or a falling edge of the digital output signal.

12. The control circuit as claimed in claim 7, wherein the mask signal is a pulse signal with an adjustable pulse width, the digital output signal is provided with a duty cycle, and the adjustable pulse width is less than the duty cycle.

13. The control circuit as claimed in claim 7, wherein the digital output signal is provided with an adjustable duty cycle, and the predetermined time interval is less than the adjustable duty cycle.

14. The control circuit as claimed in claim 7, wherein the digital output signal and the mask signal each has an adjustable frequency.

15. The control circuit as claimed in claim 7, wherein the mask circuit generates the PWM signal in response to the external PWM signal.

16. A control circuit for controlling a direct current (DC) brushless motor, the control circuit comprising:
- a first terminal and a second terminal both coupled to the DC brushless motor;
- a third terminal receiving a pulse width modulation (PWM) signal;
- a bus;
- an output circuit, coupled to the bus, and generating a digital output signal synchronous with the PWM signal in response to the PWM signal, the digital output signal is coupled to the DC brushless motor to a coil thereof and adapted to drive the DC brushless motor;
- a pulse generating circuit, coupled to the output circuit, and adapted to generate and provide a serial square wave signal to the output circuit for generating the digital output signal;
- a detecting circuit, coupled to the first terminal, the second terminal and the pulse generating circuit, detecting a back electromotive force (BEMF) generated in accordance with operation of the DC brushless motor via the first terminal and the second terminal, generating a detection signal in response to the BEMF, in which the pulse generating circuit generates the serial square wave signal in response to the detection signal; and
- a mask circuit coupled to the third terminal and the pulse generating circuit, generating a mask signal in response to the PWM signal, in which the pulse generating circuit generates the serial square wave signal in response to the mask signal in a predetermined time interval.

17. The control circuit as claimed in claim 16, wherein the mask circuit generates the mask signal by the occurrence of a rising edge or a falling edge of the digital output signal.

18. The control circuit as claimed in claim 16, wherein the mask signal is a pulse signal with an adjustable pulse width, the digital output signal is provided with a duty cycle, and the adjustable pulse width is less than the duty cycle.

19. The control circuit as claimed in claim 16, wherein the digital output signal and the mask signal each has an adjustable frequency.

* * * * *